(Model.)
C. DOMSCHKE.
PLOW.
No. 252,022.                    Patented Jan. 10, 1882.
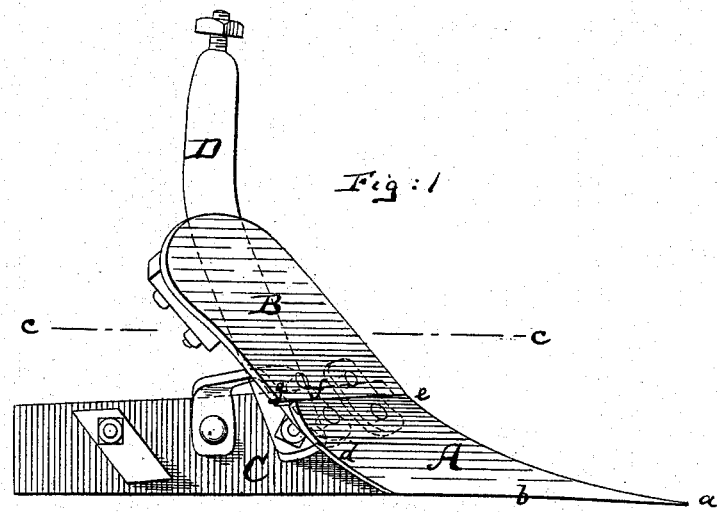
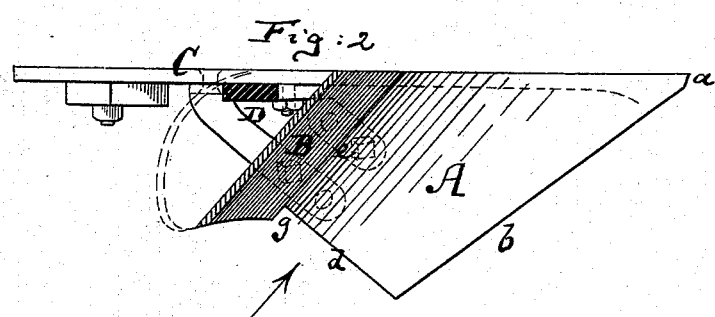
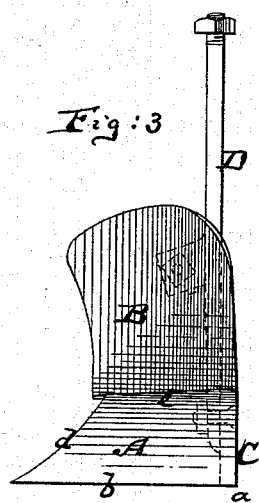
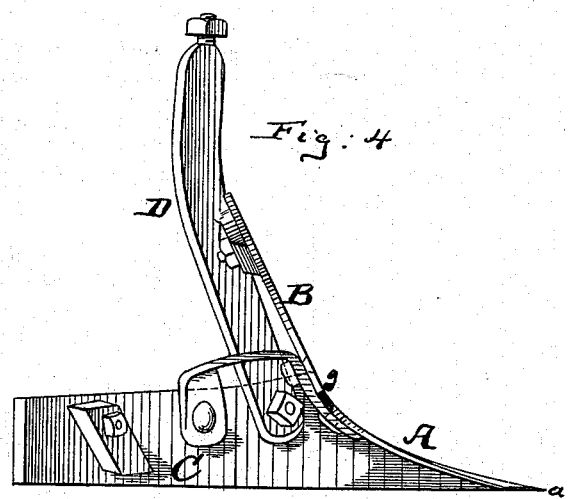
Witnesses:
Henry F. Parker
John C. Tunbridge
Inventor:
Charles Domschke
by his attorneys
Briesen & Betts

UNITED STATES PATENT OFFICE.

CHARLES DOMSCHKE, OF AUSTIN, TEXAS.

PLOW.

SPECIFICATION forming part of Letters Patent No. 252,022, dated January 10, 1882.

Application filed October 5, 1881. (Model.)

To all whom it may concern:

Be it known that I, CHARLES DOMSCHKE, of Austin, in the county of Travis and State of Texas, have invented an Improvement in Plows, of which the following is a specification.

Figure 1 is a side view of my improved plow. Fig. 2 is a horizontal section of the same on the plane of the line $c\ c$, Fig. 1. Fig. 3 is a front view of the same; and Fig. 4 is a back view of the same, looking at it in the direction of the arrow which is shown in Fig. 2.

This invention relates to an improvement in plows, and has more particular reference to the construction of the mold-board and to the arrangement thereof relative to the plowshare. The mold-board, instead of being curved or concave, as usually has been the case, is, in accordance with my invention, made perfectly flat, and so constructed that it projects at one corner slightly beyond the upper edge of the plowshare. By this means the retention of soil on the high and narrow mold-board is entirely avoided, and consequently the plow can be moved through the soil with less difficulty than if weighted by adhering soil. The flat mold-board has the further advantage of serving to crumble the furrow-slice, whereas the concave mold-board is apt to turn the slice over without loosening it. By crumbling the slice the flat mold-board serves to turn the soil completely over.

In the accompanying drawings, the letter A represents the plowshare; B, the mold-board; C, the plow-bar on the landside, and D the standard or post of the plow.

The plowshare is made preferably with a blunt point, $a$, lower oblique cutting-edge, $b$, and with a straight side, $d$, opposite the plow-bar. (See Fig. 2.) The face of the plowshare is slightly concave from its point to its top or rear, as clearly indicated in Figs. 1 and 4. The upper edge, $e$, of the plowshare is preferably straight and somewhat inclined toward the line $b$.

The mold-board B is made of a piece of entirely flat steel, as shown in Fig. 4, and is high and comparatively narrow. Its lower edge, $f$, which rests on the edge $e$ of the plowshare, is preferably straight, and its other edges are rounded, as shown in Fig. 1. The mold-board is set obliquely to the standard D, so as to receive the furrow-slice and turn it in the proper manner. The lower part of the mold-board is slightly wider than the upper part of the plowshare, so as to produce the projecting shoulder or corner $g$, whereby the crumbling of the soil and the turning thereof are greatly facilitated.

By making the mold-board flat instead of concave, as has usually been the case, great advantages in plowing are gained. It can be kept clean without difficulty. Nothing will adhere to it during the act of plowing, and the soil will be turned more completely and loosened than with a concave mold-board. The manner of fastening the plowshare and mold-board and plow-bar together and to the standard may, of course, be varied, and may be the same as has heretofore been practiced.

It will be seen that the flat mold-board, by sitting directly on the upper edge of the plowshare, covering the same throughout its entire extent, and by being inclined to the same angle as the upper part of the said plowshare, does not offer obstruction or impediment to the upward movement of the soil along the inclined faces of said plowshare and mold-board.

I claim—

1. The combination, in a plow, of the share A, concave in line from its point to its top or rear, and the high and narrow mold-board B, having its surface flat or without curve, as shown and described.

2. The combination, in a plow, of the share A, concave in line from its point to its top or rear, and the high and narrow mold-board, having its surface flat or without curve and forming the projecting corner $g$, substantially as specified.

CHARLES DOMSCHKE.

Witnesses:
JAS. WAHRENBERGER,
JOSEPH SCHUBER.